United States Patent [19]
Krisher

[11] Patent Number: 6,079,512
[45] Date of Patent: Jun. 27, 2000

[54] MOTOR VEHICLE WHEEL END ASSEMBLY

[75] Inventor: James A. Krisher, Fort Wayne, Ind.

[73] Assignee: Dana Corporation, Toledo, Ohio

[21] Appl. No.: 08/746,914

[22] Filed: Nov. 19, 1996

[51] Int. Cl.[7] .................................................. B60G 3/00
[52] U.S. Cl. ........................................ 180/259; 180/254
[58] Field of Search ................................... 180/252, 253, 180/254, 255, 256, 260, 258, 259

[56] References Cited

U.S. PATENT DOCUMENTS

| | | |
|---|---|---|
| 1,903,189 | 3/1933 | Miller . |
| 2,402,562 | 6/1946 | Lewis . |
| 3,028,924 | 4/1962 | Cooper . |
| 3,940,159 | 2/1976 | Pringle . |
| 4,300,651 | 11/1981 | Krude . |
| 4,352,528 | 10/1982 | Guimbretiere . |
| 4,359,128 | 11/1982 | Krude . |
| 4,383,588 | 5/1983 | Krude . |
| 4,442,914 | 4/1984 | Nishihara ................................. 180/255 |
| 4,565,389 | 1/1986 | Kami et al. ............................. 180/256 |
| 4,700,813 | 10/1987 | Rath . |
| 4,778,286 | 10/1988 | Kadokawa . |
| 4,792,020 | 12/1988 | Okumura et al. . |
| 4,858,998 | 8/1989 | Welschof et al. . |
| 4,865,160 | 9/1989 | Casey . |
| 4,988,220 | 1/1991 | Christiansen et al. . |
| 5,097,702 | 3/1992 | Nantua et al. . |
| 5,143,458 | 9/1992 | Alff et al. . |
| 5,209,580 | 5/1993 | Nakayama . |
| 5,263,366 | 11/1993 | Sakamoto . |
| 5,494,129 | 2/1996 | Krude et al. ............................. 180/256 |
| 5,507,510 | 4/1996 | Kami et al. . |
| 5,538,273 | 7/1996 | Osenbaugh et al. . |

Primary Examiner—Anne Marie Boehler
Attorney, Agent, or Firm—Oldham & Oldham Co., L.P.A.

[57] ABSTRACT

Motor vehicle wheel end assembly for a driving and steering axle of a motor vehicle including a constant velocity (CV) joint having an outside member or race which acts as a spindle and incorporates an outside diameter mounted bearing assembly which is retained by a snap ring in an outwardly extending snap ring groove located in a bore extending through the steering knuckle such that the outside diameter of the outside member or race of the constant velocity (CV) joint provides a pilot for a hub flange mounting member and a hub flange including a wheel on which the motor vehicle tire is mounted which is rotationally coupled to the hub flange mounting member.

11 Claims, 1 Drawing Sheet

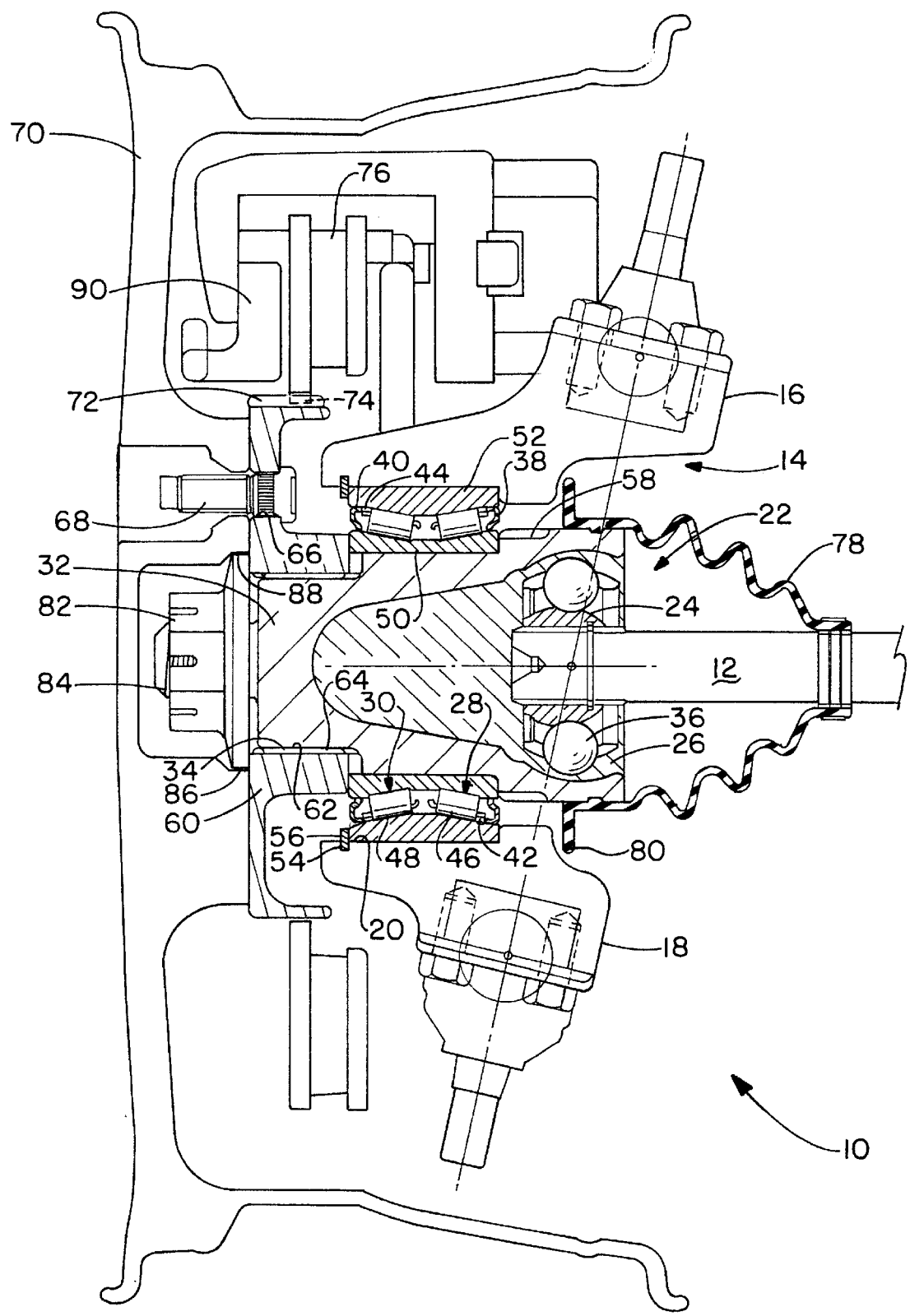

MOTOR VEHICLE WHEEL END ASSEMBLY

BACKGROUND AND SUMMARY OF THE INVENTION

The present invention relates generally to a new and novel motor vehicle wheel end assembly. More particularly, the present invention relates to a wheel end assembly for a driving and steering axle of a motor vehicle including a constant velocity (CV) joint having an outside member or race which provides a pilot for a hub flange mounting member and a hub flange including a wheel on which the motor vehicle tire is mounted which is rotationally coupled to the hub flange mounting member.

The driving and steering axle of a motor vehicle typically includes an axle or shaft which originates from a differential at its inward end and connects to a constant velocity (CV) joint at its outward end. The constant velocity (CV) joint normally includes an inner race which is connected for rotation with the axle shaft to receive torque therefrom and an outer race which receives torque from the inner race at a constant angular velocity through a torque transferring arrangement such as torque transmitting balls. The outer race is generally coupled for rotation with a spindle which is, in turn, coupled for rotation with a wheel hub. The wheel hub is typically supported for rotation by one or more bearing assemblies which are positioned within a bore formed through the steering knuckle. The wheel hub generally includes a wheel mounting flange formed in its outward regions to allow a wheel to be mounted thereto and secured for rotation with the wheel hub using a plurality of wheel mounting studs and associated internally threaded wheel mounting lugnuts. A disk brake rotor is also typically secured adjacent to the wheel mounting flange by the wheel mounting studs.

Such prior art motor vehicle wheel end assemblies generally include a variety of components which add to the complexity, weight, cost, ease of assembly and disassembly, and the ease of adjustment of such prior art motor vehicle wheel end assemblies.

A preferred embodiment of the present invention is, therefor, directed to a motor vehicle wheel end assembly for a driving and steering axle of a motor vehicle including a constant velocity (CV) joint having an outside member or race which acts as a spindle and incorporates an outside diameter mounted bearing assembly which is retained by a snap ring in an outwardly extending snap ring groove located in a bore extending through the steering knuckle such that the outside diameter of the outside member or race of the constant velocity (CV) joint provides a pilot for a hub flange mounting member and a hub flange including a wheel on which the motor vehicle tire is mounted which is rotationally coupled to the hub flange mounting member.

Accordingly, wheel end assemblies in accordance with the present invention provide a simple, cost-effective arrangement for a driving and steering axle of a motor vehicle.

Other advantages and novel features of the present invention will become apparent in the following detailed description of the invention when considered in conjunction with the accompanying drawing.

BRIEF DESCRIPTION OF THE DRAWING

FIG. 1 illustrates a sectional side view, partly in cross-section and partly in plan view, of a motor vehicle wheel end assembly in accordance with a preferred embodiment of the present invention.

DETAILED DESCRIPTION OF THE DRAWINGS

In the following detailed description of a preferred embodiment of the present invention, reference is made to the accompanying drawing which, in conjunction with this detailed description, illustrate and describe a preferred embodiment of a motor vehicle wheel end assembly in accordance with the present invention. Referring now to FIG. 1, which illustrates a sectional side view, partly in cross-section and partly in plan view, of a motor vehicle wheel end assembly, generally identified by reference numeral 10, in accordance with a preferred embodiment of the present invention, wheel end assembly 10 is designed for use on a driving and steering axle of a motor vehicle. Accordingly, wheel end assembly 10 would typically be utilized in conjunction with the front axle of a front-wheel drive motor vehicle or in conjunction with the front axle of a four-wheel drive motor vehicle, although its use is not necessarily limited to such environments. The driving and steering axle of a motor vehicle normally includes a differential (not shown) which is positioned between two (2) wheel end assemblies 10 for receiving torque from a transaxle or four-wheel drive transfer case (not shown) and for transmitting the torque so received to either or both wheel end assemblies 10 through torque transferring axle shaft 12. Torque transferring axle shaft 12 may also be housed within a non-rotating axle tube housing (not shown) if desired.

Wheel end assembly 10 generally includes steering knuckle 14 having upper mounting boss 16 and lower mounting boss 18 which allow steering knuckle 14 to be attached to the motor vehicle chassis (not shown). Steering knuckle 14 also includes at least one bore 20 extending therethrough.

Wheel end assembly 10 also includes constant velocity (CV) joint, generally indicated by reference numeral 22. Constant velocity (CV) joint 22 generally includes inner member or race 24 which is splined or otherwise drivingly coupled to torque transferring axle shaft 12 and outer member or race 26 which is supported for rotation within bore 20 of steering knuckle 14 by first bearing assembly 28 and second bearing assembly 30. Outer member or race 26 includes reduced diameter portion 32 towards its outward end, this reduced diameter portion 32 including axially extending splines 34.

Circumferentially spaced torque transmitting balls 36, of which only two (2) are shown in FIG. 1, are positioned between inner member or race 24 and outer member or race 26. Each circumferentially spaced torque transmitting ball 36 is received within one of a plurality of grooves formed in inner member or race 24 and a cooperating and corresponding one of a plurality of grooves formed in outer member or race 26 so as to transmit torque from inner member or race 24 to outer member or race 26. Circumferentially spaced torque transmitting balls 36 and grooves cooperate such that torque is transferred from inner member or race 24 to outer member or race 26 at a constant angular velocity throughout the range of steering motion of wheel end assembly 10. Circumferentially spaced torque transmitting balls 36 are typically retained within grooves in inner member or race 24 and outer member or race 26 by a cage member (not shown). Wheel end assembly 10 in accordance with the preferred embodiment of the invention described herein permits constant velocity (CV) joint 22 to be removed from wheel end assembly 10 without necessitating removal of steering knuckle 14. It should also be noted that other arrangements for providing a constant angular velocity coupling of inner member or race 24 and outer member or race 26 are known, and this invention is not intended to be limited to any particular arrangement for providing such a constant angular velocity coupling between inner member or race 24 and outer member or race 26.

Constant velocity (CV) joint 22, and more particularly outer member or race 26 thereof is supported for rotation within bore 20 of steering knuckle 14 by first bearing assembly 28 and second bearing assembly 30. Inner seal 38 and outer seal 40 are preferably provided to preclude dirt, water and other foreign substances from entering bore 20 of steering knuckle 14 and interfering with the operation of first bearing assembly 28 and second bearing assembly 30. First bearing assembly 28 includes retainer or cage 42 and second bearing assembly 30 includes retainer or cage 44. Retainer or cage 42 and retainer or cage 44 separate and circumferentially space the plurality of bearings 46 and 48, respectively, around first bearing assembly 28 and second bearing assembly 30, respectively. First bearing assembly 28 and second bearing assembly 30 preferably share a common inner race 50 and a common outer race 52, although separate inner races and outer races for each of first bearing assembly 28 and second bearing assembly 30 could alternatively be used. First bearing assembly 28 and second bearing assembly 30 are preferably unitary bearing assemblies which are piloted on their outside diameters in bore 20 of steering knuckle 14. Bearings 46 of first bearing assembly 28 and bearings 48 of second bearing assembly 30 are preferably tapered roller or cartridge-type bearings, although this invention is not intended to be limited to this or any other type of bearing assembly in particular. For example, ball bearings could be utilized in place of tapered roller or cartridge-type bearings in first bearing assembly 28 and second bearing assembly 30.

With the arrangement of wheel end assembly 10 as described herein, during assembly or disassembly of wheel end assembly 10, first bearing assembly 28 and second bearing assembly 30 may be piloted on or removed from their position in bore 20 in steering knuckle 14. Thus, if either or both first bearing assembly 28 and/or second bearing assembly 30 need to be replaced, first bearing assembly 28 and second bearing assembly 30 may be removed from bore 20 in steering knuckle 14, discarded and replaced with similar relatively low-cost bearing assemblies. In this manner, first bearing assembly 28 and second bearing assembly 30 may be readily replaced and/or serviced. In addition, by forming inner race 50 separate from the outside diameter of outer member or race 26 of constant velocity (CV) joint 22 and by forming outer race 52 separate from the inside diameter of bore 20 in steering knuckle 14, outer member or race 26 of constant velocity (CV) joint 22 and steering knuckle 14 do not need to be fabricated from expensive, high quality, bearing grade steel, as would normally be the case if the outside diameter of outer member or race 26 of constant velocity (CV) joint 22 and the inside diameter of bore 20 in steering knuckle 14 were utilized to interface directly with first bearing assembly 28 and second bearing assembly 30. Furthermore, first bearing assembly 28 and second bearing assembly 30 may be replaced without removing or replacing outer member or race 26 of constant velocity (CV) joint 22 or steering knuckle 14.

Bore 20 of steering knuckle 14 also preferably includes outwardly extending snap ring groove 54 which engages snap ring 56 therein to assist in the proper positioning of outer race 52, and thus, first bearing assembly 28 and second bearing assembly 30, and preclude axial movement of first bearing assembly 28 and second bearing assembly 30. Tone ring 58 is preferably integral with outer member or race 26 of constant velocity (CV) universal joint 22 to coact with a sensor (not shown) to provide input signals for an anti-skid braking (ASB) braking system, a traction control system or a similar system utilizing measurements of the wheel speed. Outer member or race 26 of constant velocity (CV) joint 22 and tone ring 58 are preferably integrally fabricated by, for example, utilizing a net-forming forging process.

Wheel end assembly 10 also includes hub flange mounting member 60 having cylindrical opening 62 with axially extending splines 64 which correspond to and engage axially extending splines 34 outwardly extending from reduced diameter portion 32 of outer member or race 26 of constant velocity (CV) joint 22 to transfer torque from outer member or race 26 of constant velocity (CV) joint 22 to hub flange mounting member 60. The splined connection between outer member or race 26 of constant velocity (CV) joint 22 and hub flange mounting member 60 maintains radial concentricity and transfers torque therebetween. Axial runout of hub flange mounting member 60 is minimized due to the low dimensional variation typically associated with the width of first bearing assembly 28 and second bearing assembly 30.

Hub flange mounting member 60 preferably includes a plurality of holes 66 formed therein. A plurality of wheel mounting studs 68 are inserted into holes 66 to receive and secure hub flange 70, including a wheel on which a motor vehicle tire (not shown) is mounted thereon, for rotation with hub flange mounting member 60. By providing a splined connection between hub flange mounting member 60 and hub flange 70 and outer member or race 26 of constant velocity (CV) joint 22, hub flange mounting member 60 and hub flange 70 can move axially relative to outer member or race 26 of constant velocity (CV) joint 22, but radial movement therebetween is precluded. Furthermore, hub flange 70 and hub flange mounting member 60 can be readily removed to provide access to snap ring 56, as well as first bearing assembly 28 and second bearing assembly 30 for repair and/or removal and replacement thereof.

Hub flange mounting member 60 includes a second set of axially extending splines 72 on its outside diameter surface which correspond to and engage a corresponding set of splines 74 formed on an inside diameter of brake rotor 76 for rotational engagement between hub flange mounting member 60 and brake rotor 76. This splined connection between hub flange mounting member 60 and brake rotor 76 permits relative axial movement between hub flange mounting member 60 and brake rotor 76. Thus, hub flange mounting member 60 and brake rotor 76 are partially integrated, permitting brake rotor 76 to move axially while the brake caliper 90 is rigidly attached to steering knuckle 14.

Wheel end assembly 10 also preferably includes constant velocity (CV) cover or boot 78. Constant velocity (CV) cover or boot 78 is preferably fabricated from a flexible material, such as rubber, and serves to preclude dirt, water and other foreign substances from entering into and interfering with the operation of constant velocity (CV) joint 22. Constant velocity (CV) cover or boot 78 preferably includes flange 80 which extends outwardly from the side of constant velocity (CV) cover or boot 78 near the outer end of constant velocity (CV) cover or boot 78. Flange 80 acts as a slinger and assists in protecting tone ring 58 and its associated sensor (not shown) from excessive dirt, water and other foreign substances which could interfere with the operation of tone ring 58 and its associated sensor (not shown).

Wheel end assembly 10 can be readily disassembled for inspection, cleaning, regreasing and/or replacement of first bearing assembly 28 and second bearing assembly 30.

Similarly, providing first bearing assembly 28 and second bearing assembly 30 as removable bearing assemblies permits first bearing assembly 28 and second bearing assembly 30 to be easily removed and replaced without replacing any part of constant velocity (CV) joint 22, hub flange mounting member 60 or hub flange 70. Furthermore, as previously discussed, providing first bearing assembly 28 and second bearing assembly 30 as being removable in wheel end assembly 10 also allows constant velocity (CV) joint 22, hub flange mounting member 60 and hub flange 70 to b e fabricated in a cost effective manner since there is no need to utilize expensive, high-quality bearing grade steel to fabricate these components since first bearing assembly 28 and second bearing assembly 30 do not directly interface with these components.

In operation, torque transferring axle shaft 12 receives torque from a differential (not shown). Inner member or race 24 of constant velocity (CV) joint 22 receives this torque from torque transferring axle shaft 12 through a splined connection or otherwise and transmits this torque through circumferentially spaced torque transmitting balls 36 to outer member or race 26 of constant velocity (CV) joint 22. Outer member or race 26 of constant velocity (CV) joint 22 transfers the torque through a splined connection or otherwise to hub flange mounting member 60. Hub flange mounting member 60 then transfers the torque to wheel mounting studs 68 and then through a bolted connection to hub flange 70, including a wheel and a motor vehicle tire (not shown) mounted thereon. Since brake rotor 76 is also rotationally coupled to hub flange mounting member 60 through a splined connection or otherwise, the rotation of hub flange mounting member 60 is also controlled by brake rotor 76.

It should be noted that wheel end assembly 10 in accordance with the present invention provides several advantages over known prior art motor vehicle wheel end assemblies. For example, the scrub radius of wheel end assembly 10 can be reduced by increasing the diameters of first bearing assembly 28 a nd second bearing assembly 30 to permit relocation of constant velocity (CV) joint 22 outward. Also, first bearing assembly 28 and second bearing assembly 30 can utilize less expensive cartridge-type bearings instead of the more expensive flanged bearings which are typically used in such applications. In addition, first bearing assembly 28 and second bearing assembly 30 are retained by snap ring 56 positioned in outwardly extending snap ring groove 54 in bore 30 in steering knuckle 14 rather than the three (3) bolt mounting arrangement typically used in known prior art motor vehicle wheel end assemblies. Furthermore, wheel end assembly 10 in accordance with the present invention allows brake rotor 76 to float and the brake caliper 90 to be fixed rather than the more conventional design of having the brake caliper float and the brake rotor fixed. In addition, internally threaded retaining nut 82 secured to external threads 84 extending outwardly from outer member or race 26 of constant velocity (CV) joint 22 precludes axial movement of hub flange mounting member 60 and preloads first bearing assembly 28 and second bearing assembly 30. Furthermore, outside diameter 86 of internally threaded retaining nut 82 is positioned in opening 88 of hub flange 70 to axially position hub flange 70 in relation to outer member or race 26 of constant velocity (CV) joint 22.

Although the present invention has been described above in detail, the same is by way of illustration and example only and is not to be taken as a limitation on the present invention. For example, as previously discussed, various types of bearing assemblies could be readily utilized in conjunction with the motor vehicle wheel end assembly in accordance with the present invention. Accordingly, the scope and content of the present invention are to be defined only by the terms of the appended claims.

What is claimed is:

1. A wheel end assembly for a driving and steering axle of a motor vehicle, said wheel end assembly comprising:
    a steering knuckle including a bore formed therethrough;
    a constant velocity (CV) joint having an inner member or race capable of being drivingly coupled for rotation with an axle shaft to receive torque therefrom and an outer member or race drivingly coupled to said inner member or race, said outer member or race of said constant velocity (CV) joint including an integral spindle portion supported for rotation within said bore in said steering knuckle by at least one bearing assembly and said outer member or race of said constant velocity (CV) joint includes an outside diameter and said outside diameter of said outer member or race of said constant velocity (CV) joint includes an integrally formed tone ring;
    a hub flange mounting member drivingly coupled for rotation with said spindle portion of said outer member or race of said constant velocity (CV) joint, said hub flange mounting member including a plurality of wheel mounting studs; and
    a hub flange having a wheel for mounting a motor vehicle tire thereon, said hub flange being removably attached to said plurality of wheel mounting studs in said flange mounting member to rotationally couple said hub flange mounting member and said hub flange.

2. The wheel end assembly in accordance with claim 1, wherein said at least bearing assembly includes a first bearing assembly and a second bearing assembly and said first bearing assembly and said second bearing assembly are piloted within said bore in said steering knuckle.

3. The wheel end assembly in accordance with claim 1, wherein said bore of said steering knuckle includes an outwardly extending snap ring groove therein and said at least one bearing assembly includes a first bearing assembly and a second bearing assembly and said first bearing assembly and said second bearing assembly are piloted within said bore in said steering knuckle and are axially retained by a snap ring engaged in said outwardly extending snap ring groove in said bore in said steering knuckle.

4. The wheel end assembly in accordance with claim 1, wherein said bore in said steering knuckle includes an outwardly extending snap ring groove therein and said at least one bearing assembly includes a first bearing assembly and a second bearing assembly and said first bearing assembly and said second bearing assembly share an outer race and said outer race is piloted within said bore in said steering knuckle and is axially retained by a snap ring engaged in said outwardly extending snap ring groove in said bore in said steering knuckle.

5. The wheel end assembly in accordance with claim 4, wherein said hub flange and said hub flange mounting member are removably mounted to said outer member or race of said constant velocity (CV) joint to permit removal of said hub flange and said hub flange mounting member and access to said snap ring and said first bearing assembly and said second bearing assembly.

6. The wheel end assembly in accordance with claim 1, wherein said outer member or race of constant velocity (CV) joint and said integrally formed tone ring are fabricated utilizing a net-form forging process.

7. The wheel end assembly in accordance with claim 1, further including a constant velocity (CV) cover or boot positioned about the axle shaft and interior of said constant velocity (CV) joint to preclude the entry of dirt, water and other foreign substances which may interfere with the operation of said constant velocity (CV) joint.

8. The wheel end assembly in accordance with claim 7, wherein said constant velocity (CV) cover or boot is fabricated from a flexible material and includes an outwardly extending flange which acts as a slinger to preclude the entry of dirt, water and other foreign substances which may interfere with the operation of said tone ring.

9. The wheel end assembly in accordance with claim 1, further including a brake rotor rotationally coupled to said hub flange mounting member.

10. The wheel end assembly in accordance with claim 1, further including a brake rotor rotationally coupled to said hub flange mounting member by a splined connection permitting relative axial movement between said brake rotor and said hub flange mounting member.

11. The wheel end assembly in accordance with claim 1, further including a constant velocity (CV) cover or boot positioned about the axle shaft and interior of said constant velocity (CV) joint to preclude the entry of dirt, water and other foreign substances which may interfere with the operation of said constant velocity (CV) joint.

* * * * *